(12) United States Patent
Knox

(10) Patent No.: US 8,265,545 B2
(45) Date of Patent: *Sep. 11, 2012

(54) WIRELESS ENVIRONMENT METHOD AND APPARATUS

(76) Inventor: Gregory Knox, Van Nuys, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/101,841

(22) Filed: May 5, 2011

(65) Prior Publication Data

US 2011/0257774 A1     Oct. 20, 2011

Related U.S. Application Data

(63) Continuation of application No. 12/363,593, filed on Jan. 30, 2009, now Pat. No. 7,962,090, which is a continuation of application No. 10/878,731, filed on Jun. 28, 2004, now Pat. No. 7,502,604, which is a continuation of application No. 09/798,331, filed on Mar. 1, 2001, now Pat. No. 6,757,913, which is a continuation of application No. 08/886,951, filed on Jul. 2, 1997, now Pat. No. 6,212,359.

(60) Provisional application No. 60/021,721, filed on Jul. 15, 1996.

(51) Int. Cl.
*H04H 40/00* (2008.01)
(52) U.S. Cl. ...................... 455/3.06; 455/3.01
(58) Field of Classification Search ............... 455/3.06, 455/3.05, 3.02, 3.01; 725/153
See application file for complete search history.

(56) References Cited

U.S. PATENT DOCUMENTS

| 6,212,359 | B1 * | 4/2001 | Knox | 725/135 |
| 6,757,913 | B2 * | 6/2004 | Knox | 725/153 |
| 7,502,604 | B2 | 3/2009 | Knox | |
| 7,962,090 | B2 | 6/2011 | Knox | |

* cited by examiner

*Primary Examiner* — Lewis West

(57) ABSTRACT

A method and apparatus are provided for a first controlled device, such as a wireless local transmitter that accepts a plurality of digital audio signals and corresponding program information signals converted from a controlled source, such as the encoded digital data provided by a digital data signal source, typically a community antenna television (CATV) cable or direct broadcast satellite, then modulates said digital audio and corresponding program information signals on different carrier frequencies and transmits the modulated signals to a plurality of second controlled devices, such as remote digital receiver/tuners that demodulate said signals to output music in stereophonic sound and display the corresponding program information by means of an alphanumeric display. The first and second controlled devices contain microprocessor systems for communicating, controlling, storing, processing, and display of digital data within the operation of the respective system. A high speed, error free digital signal protocol is utilized for transmitting digital audio and corresponding program information signals to and from the digital receiver/tuner. The digital data transmitter and digital receiver/tuners utilize the 44.1 kilohertz (kHz) Compact Disc (CD) clock signal embedded in digital audio signals provided by an established delivery system to derive clocking signals for reception and processing of digital audio signals and for implementing the display information communications protocol.

20 Claims, 5 Drawing Sheets

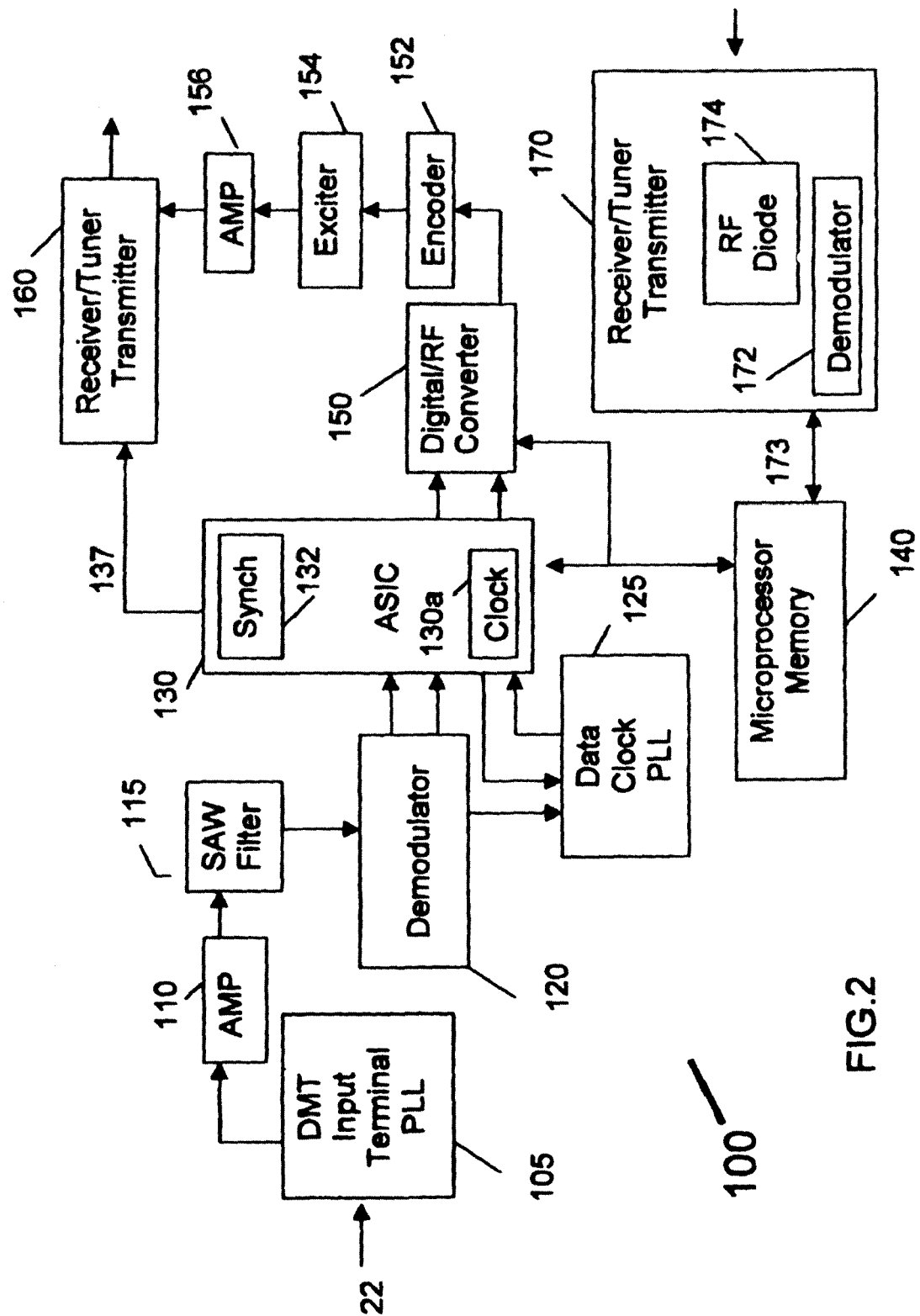
FIG.2 Digital Music Transmitter

Receiver/Tuner - Top View

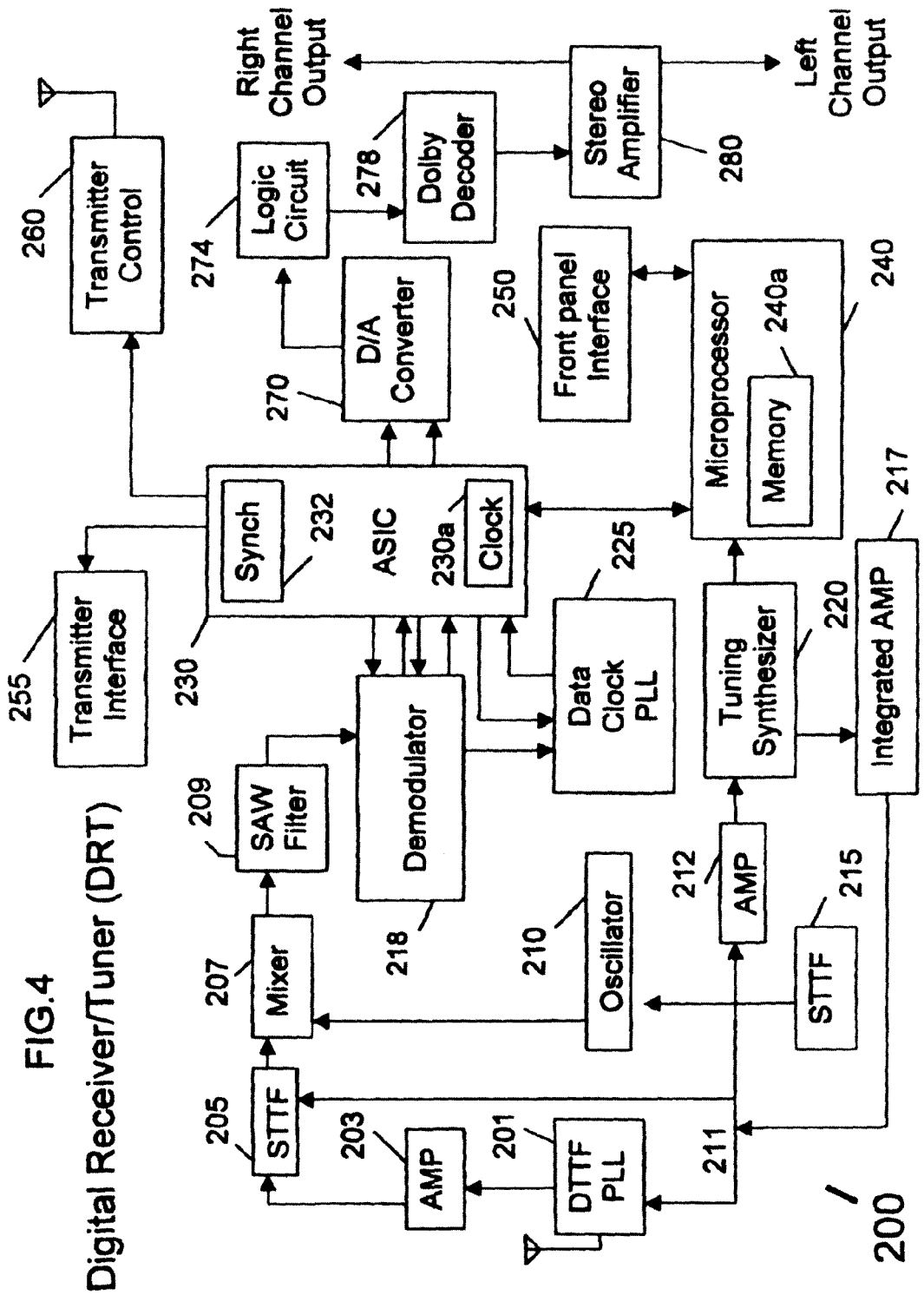

WIRELESS ENVIRONMENT METHOD AND APPARATUS

CROSS REFERENCE TO RELATED DOCUMENTS

This application is a continuation of U.S. patent application Ser. No. 12/363,593 filed Jan. 30, 2009 now U.S. Pat. No. 7,962,090 entitled "Method And Apparatus for Satellite Digital Audio," which is a continuation of Ser. No. 10/878,731, now U.S. Pat. No. 7,502,604 filed Jun. 28, 2004 entitled "Wireless Environment Method And Apparatus," which is a continuation of Ser. No. 09/798,331, now U.S. Pat. No. 6,757,913 filed Mar. 1, 2001 entitled "Wireless Music & Data Transceiver System" which is a continuation of Ser. No. 08/886,951, filed Jul. 2, 1997, now U.S. Pat. No. 6,212,359 entitled "Transceiver System For Digital Music" which claims benefit of provisional application Ser. No. 60/021,721, filed Jul. 15, 1996 entitled "Wireless Stereophonic Transmitter And Receiver/Tuner System," said applications are incorporated herein by reference in their entirety and made a part hereof.

BACKGROUND OF THE INVENTION

The cable television industry developed and refined a process of audio signal compression in the mid-1980's. The process allows for extra space on coaxial cable wire by electronically compressing audio signals between the video bandwidths that carry the television signal. By the late 1980's, audio signal compression technology spawned an industry that has come to be known as "digital music." Digital music is developed by cable conglomerates and is sold to subscribers along with their cable television service. This audio music signal is produced at one location by using multiple compact disc players playing continuous music in a variety of formats then sent via satellite to local cable companies. The audio music service is also currently available as a premium service via direct broadcast satellite (DBS), but other methods, such as fiber optics, telephone systems, microwaves, or Internet enabled technologies for example, could also deliver the signal.

The local multisystem operators (cable and DBS companies sell the service to subscribers who pay a monthly fee for a headunit or "tuner") compress the signal, then sell the service to subscribers. This unit decompresses the audio signal, then converts it into an analog signal which can be heard through the television audio source or be used in conjunction with a home stereo component system. The user can choose from multiple channels using an infrared remote control or with tuner controls located on the headunit. With the Digital Music Express product, including song title, artist, album, and record label can be viewed on an LCD (liquid crystal display) window located on the infrared remote that operates the tuner as described in U.S. Pat. No. 5,445,570. This system to Cook correctly postulates the value of listener access to program information; specifically, that there is a strong possibility for loss of revenue due to subscription cancellation if a subscriber has no method of knowing the program information that corresponds to the song they are listening to. Furthermore, Cook explains that to the music industry, identification of the recording label and the musical selection is critical to the sale of recordings.

Digital music has not developed as proponents predicted. Since its national introduction in the early 1990's, sales penetration has been an unimpressive 1.5-2.5 percent among the multisystem operators offering the service. Research has revealed that digital audio is a unique product, but with very little recognition among subscribers. And, despite a myriad of marketing schemes, neither operators nor the two major cable audio producers can claim to have found a definitive solution to drive sales.

The problem with the current product is that it is not versatile. It can only interface with an existing stereo component or loudspeaker system. Subscribers are also bound to a single choice of music located in the room where the converter/tuner box is located. Because the cable music service is not available in the convenience of technology such as a portable disc player, a portable bookshelf stereo, a portable radio/tape player, or more popular mediums for listening to electronic music, it will never be as attractive as it could be to the consumers who would most appreciate its advantages.

As mentioned above, presently, the only means to access the audio signal provided by the cable music services is through use of a stationary output device, such as a rack stereo system with auxiliary inputs for the digital music tuner. U.S. Pat. No. 5,282,028 entitled "Remote Control for Digital Music Terminal with Synchronized Communications" and U.S. Pat. No. 5,455,570 entitled "Methods And Apparatus For Communication Program Data Signals Via A Remote Control Unit" incorporated herein by reference, disclose systems wherein an infrared remote controls and communicates with a digital music tuner. To use the tuner, changing channels or viewing program information, the listener must be close enough in proximity to the tuner to use the infrared remote; this can be frustrating if a variety of formats or program information is of interest to a listener who within sound range but out of the reception range of the remote control. Also, only one music channel can be accessed at a time, limiting all listeners to a single music format. Additionally, if currently available tuners were combined with multiple output devices in a single structure, competing tastes in music preference and volume would contribute to unnecessary costs and unwanted noise pollution. Prior art has recognized the value in wireless stereophonic signals. U.S. Pat. No. 4,829,570 to Borchardt describes a F.M. (frequency modulation) signal transmitter/receiver system which is then outputted to loudspeakers. The Borchardt system converts an audio signal into a F.M. signal, transmits the F.M. signal over A.C. power lines, and reconverts the F.M. signal into an audio signal which is outputted at the source. The problem with such a device is that it has limited function. Only one signal is sent from the transmitter to the receiver. The receiver must be a stationary device with auxiliary inputs to accommodate the transmitted signal. And, the listener must return to the signal source to change the input. RF Link markets a similar product, Wavecom Jr., that transmits audio and video signals on a gigahertz frequency, but is subject to the same limitations of the Borchardt system. U.S. Pat. No. 5,491,839 entitled "System For Short Range Transmission Of A Plurality Of Signals Simultaneously Over The Air Using High Frequency Carriers" to Schotz discloses a system for transmitting analog or digital signals. Schotz suggests that three electrical input signals be comprised of conventional audio sources, such as a compact disk, or tape deck, but not digital audio or program information to a plurality of receiver/tuners that allow a listener to interact with the music service.

In general, such prior art systems are limited in range, signal strength, variety of channels, program information available, and overall accessibility and ease of use. Consequently, a requirement exists for a local transmitter and digital receiver/tuner system that communicates under a control to provide reception of the digital audio music and display of corresponding program information which can be located at the convenience and discretion of multiple listeners.

OBJECTS OF THE INVENTION

It is, therefore, the object of the present to provide a wireless local transmitter and digital receiver/tuner system for transmitting and receiving digital audio and corresponding program information that will overcome the limitations of conventional methods of transmitting and receiving digital audio and corresponding program information.

It is another object of this invention to provide a transmitter that can receive digital audio and program information input from a plurality of sources and can simultaneously broadcast a plurality of digital audio and program information signals over a limited range.

It is still another object of this invention to provide a transmitter that can simultaneously broadcast a plurality of digital audio and program information signals via a combined digital signal.

It is an additional object of this invention to provide receivers that can simultaneously receive a plurality of combined digital audio and program information signals broadcast by the transmitter, and can select one of the digital audio signals and display corresponding program information signals broadcast from the transmitter.

It is still an additional object of the present invention to utilize an existing clock oscillator having a predefined frequency within a first and second device to enable the transmission and reception of digital audio and program information between the two devices using the predefined frequency to generate a wireless digital carrier signal.

It is a further object of the present invention to provide a two-way communications link between a plurality of receiver/tuners and the first controllable device which allows the listener to interact with the service with, for example, viewing program information, participate in surveys of music preferences, or storing program information for future use, or purchase of music via electronic accounts.

It is yet a further object of the present invention to provide an error detecting or an error checking process for receiving an entire, error-free message from a predetermined number of transmissions between a controllable device and a receiver/tuner of a message defined by a predetermined number of data fields.

BRIEF DESCRIPTION OF THE DRAWINGS

The following detailed description, given by way of example, and not intended to limit the present invention solely to the embodiments shown and described herein, will best be understood in conjunction with the accompanying drawings in which:

FIG. 2: is a block diagram of the transmitter of the system;

FIG. 4: is a block diagram of the receiver/tuner of the system.

SUMMARY OF THE INVENTION

Figure 1:
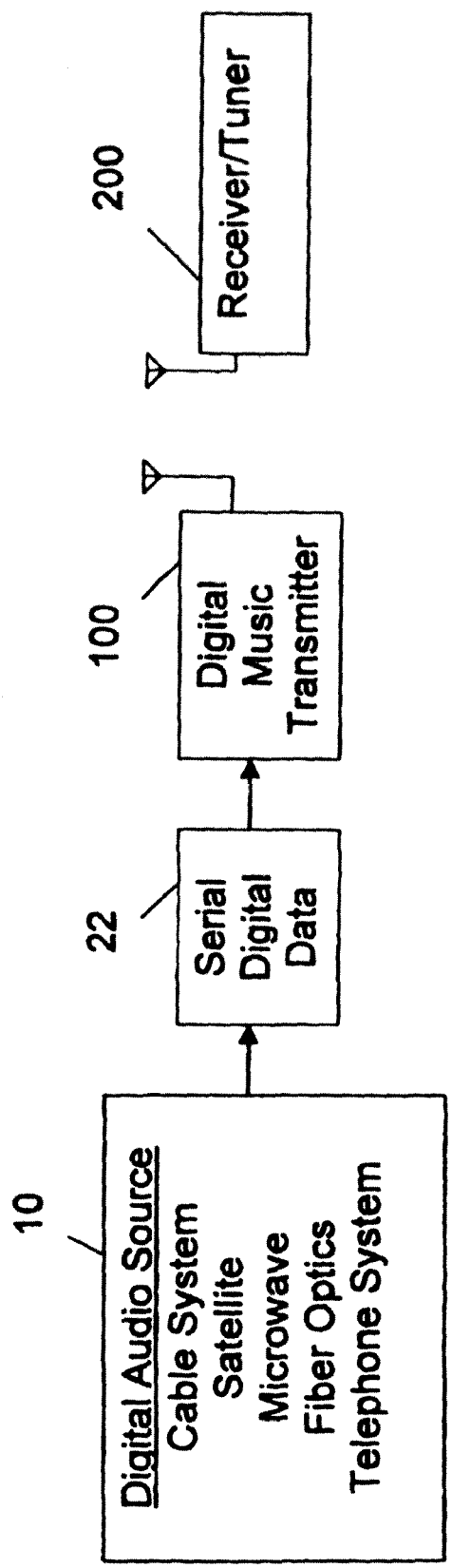
FIG. 1: is a schematic representation of the overall transmitter and receiver/tuner system configured in accordance with this invention.

The problems of providing digital audio and display of corresponding program information associated with a digital music service are solved by the principles of the present invention. The present invention ensures that a listener will continue to enjoy the advantages of digital audio, while also enabling portable reception of the service within a localized setting. Also, the invention provides a means for the user to participate in music surveys, store desired program information, and purchase of music via electronic accounts, by combing a wireless receiver/tuner unit that communicates with and controls a first controlled device, such as a digital audio and program information transmitter unit.

A system constructed in accordance with the present invention is comprised of two primary components, a transmitter and at least one receiver/tuner. The transmitter serves as an addressable controller that includes input means, encoders/decoders associated with the system, demultiplexer, service codes, converter means, carrier signal producing means, combining means, and antenna means. The converter contains a digital to RF (radio frequency) converter module, demodulator, addressable control interface logic, subscriber interface logic, and decryptor. The input means is arranged for receiving a multiplexed serial digital data audio/program information stream that includes a plurality of the digital audio, program information, and national subscriber information signals from said multiplexed serial stream.

The carrier signal producing means is arranged for providing at least a first group of carrier signals, with that group comprising a set of different carrier signals. Each of the carrier signals of the group is preselected and is different from the others of the group, and is at a frequency of at least 900 mHz.

The modulating means is coupled to the input means for modulating the carrier signals of the first group with respective ones of the plurality of input signals to produce a plurality of modulated carrier signals. The serial stream is modulated using multiphase or multilevel amplitude or frequency modulation of the carrier in the F.M. broadcast band. The means for combining is coupled to the modulating means for combing the modulated carrier signals into a combined signal and for providing the combined signal to the antenna means. The antenna means radiates the combined signal over the air.

The receiver/tuner is a device consisting of subcomponents including a microprocessor, addressable controller interface logic, RF to digital converter, signal amplifier, tuning synthesizer, subscriber interface logic, LCD display, demodulator, local oscillator, keypad interface, and output amplifier. The receiver means is arranged for receiving the combined signal and for demodulating a selected one of the carrier signals in the group so that the input signal is extracted therefrom for reproduction by transducer means coupled to the receiver means.

The transmitter means provides plural groups of different carrier signals comprising plural carrier signals which are different from the other signals in that group and from the carrier signals in the other groups and are of a frequency of at least 900 mHz. First user-selectable means are provided in the transmitter means and in the receiver means to select a desired group of carrier frequencies for system operation. Second user-selectable means are provided in the receiver means to enable the user to select a desired carrier frequency of the selected group to be demodulated so that they can hear the digital audio and view the program information signal extracted therefrom by such demodulation. The multiple groups of carrier frequencies available enables a selection of a group of carrier frequencies which are different from those which may be used by another like system operation within the operating range of the system to ensure that there will be no interference by that other system.

DETAILED DESCRIPTION OF THE INVENTION

With reference first to FIG. 1, a system is illustrated therein for local wireless transmission and reception of digital audio and program information. A delivery system 10, such as coaxial cable, satellite, the Internet, microwave, and etc., outputs a serial digital audio/program information stream 22 that contains digital audio, program information, and national subscriber information. The transmitter 100, more fully described with respect of FIGS. 2-2a, receives the said serial digital data stream 22 and demultiplexes, decrypts, and decodes the digital audio and program information signal. The digital audio signal and program information are converted to a digital RF carrier frequencies and broadcasted to a plurality of second devices, preferably at least one receiver/tuner unit 200, more fully described with respect of FIGS. 3-4, that outputs the selected audio electronically and displays the corresponding program information of the audio track currently listened to by the subscriber.

Digital Music Transmitter

FIG. 2 is a block diagram of the preferred digital music transmitter (DMT) 100. Referring to FIGS. 1-2, the serial digital data stream 22 is passed via an established system of digital data distribution 10, for example, multisystem operators coaxial cable or direct broadcast satellite, and is received by the transmitter input terminal 105. The transmitter input terminal 105 preferably includes phase-lock loop (PLL) circuitry. The signal is amplified by an amplifier 110 and filtered by a SAW filter 115 before being demodulated by a demodulator 120. The demodulator 120 converts the selected digital frequency to demodulation intermediate frequency (IF). The output of the demodulator 120 is quadrature partial response (QpR) demodulated to produce a 5.6 Mbps data stream containing 150 stereo pairs of digital audio data to an applications specific integrated circuit (ASIC) 130. The demodulator 120 provides data to a data clock recovery PLL 125. The data clock recovery PLL 125 contains a 33.8688 mHz crystal 122 (about 33.9 mHz) for timing purposes.

The ASIC 130 provides demultiplexing, decrypting, and decoding operations upon the 5.6 Mbps data stream input by the demodulator 120 to the microprocessor 140. The ASIC 130 separates the 5.6 Mbps data stream to a select one of 150 stereo pairs of digital audio signals. The selected stereo pair is decrypted and separated to provide digital audio signal and a program information signal. The digital audio signal is then decoded according to a variety of known techniques. The ASIC 130 inputs the digital audio signals, provided at a sampling rate of 44.1 kilohertz (KHz), to a digital RF converter 150. The audio signals are provided to a F.M. stereo encoder and loudness processor 152, and then to F.M. band exciter 154. The output of the exciter 154 is amplified by a high power amplifier 156 and broadcast over the airwaves by an antenna 160 as digital F.M. in the F.M. broadcast for reception by a digital F.M. receiver 201, such as disclosed in FIG. 3

A receiver 170 for a second controllable device, such as a digital receiver/tuner (DRT) 200, coupled to the microprocessor 140 receives instruction or control signals transmitted by the DRT 200 to initiate the remote control of selected functions of the transmitter 100. A clock signal generated internal to the ASIC 130 is utilized as a carrier signal to switch the output of the DRT 200 ON or OFF at a frequency of 44.1 KHz. The 44.1 KHz clock from an ASIC Clock generator 130a may be utilized to generate a carrier signal for RF signals sent by the DRT transmitter 160. The ASIC Clock signal provided by the ASIC clock 130a is derived from the about 33.9 mHz signal provided to the ASIC 130 by the data clock PLL 125. The DRT 200 operates to control selected function of the transmitter as well as the program information transmitted by the DRT transmitter 160 associated with the DMT 100.

The ASIC Clock signal provided by the ASIC clock 130 is derived from the about 33.9 mHz signal provided to the ASIC 150 by the data clock PLL 125. Specifically, the ASIC Clock signal is derived by dividing the 33.9 mHz signal by three (3) to provide a second clock signal having a frequency of 11.3 mHz, and by then dividing the 11.3 mHz signal to the preferred fixed first frequency for the 44.1 kHz ASIC Clock signal. The 11.3 mHz clock signal is utilized as a clock signal selected operations conducted by the ASIC 130. The ASIC 130 contains a synchronizing circuit 132 which is utilized to provide clock synchronized program information signals to the DRT 200. The synchronizing circuit 132 operated to provide two separate timing alignment functions. First, the synchronizing circuit 132 aligns the program information signal provided by the microprocessor to the 11.3 mHz clock signal. Second, the synchronizing circuit 132 aligns the 44.1 KHz ASIC Clock signal to the 11.3 mHz clock signal.

Figure 2A:
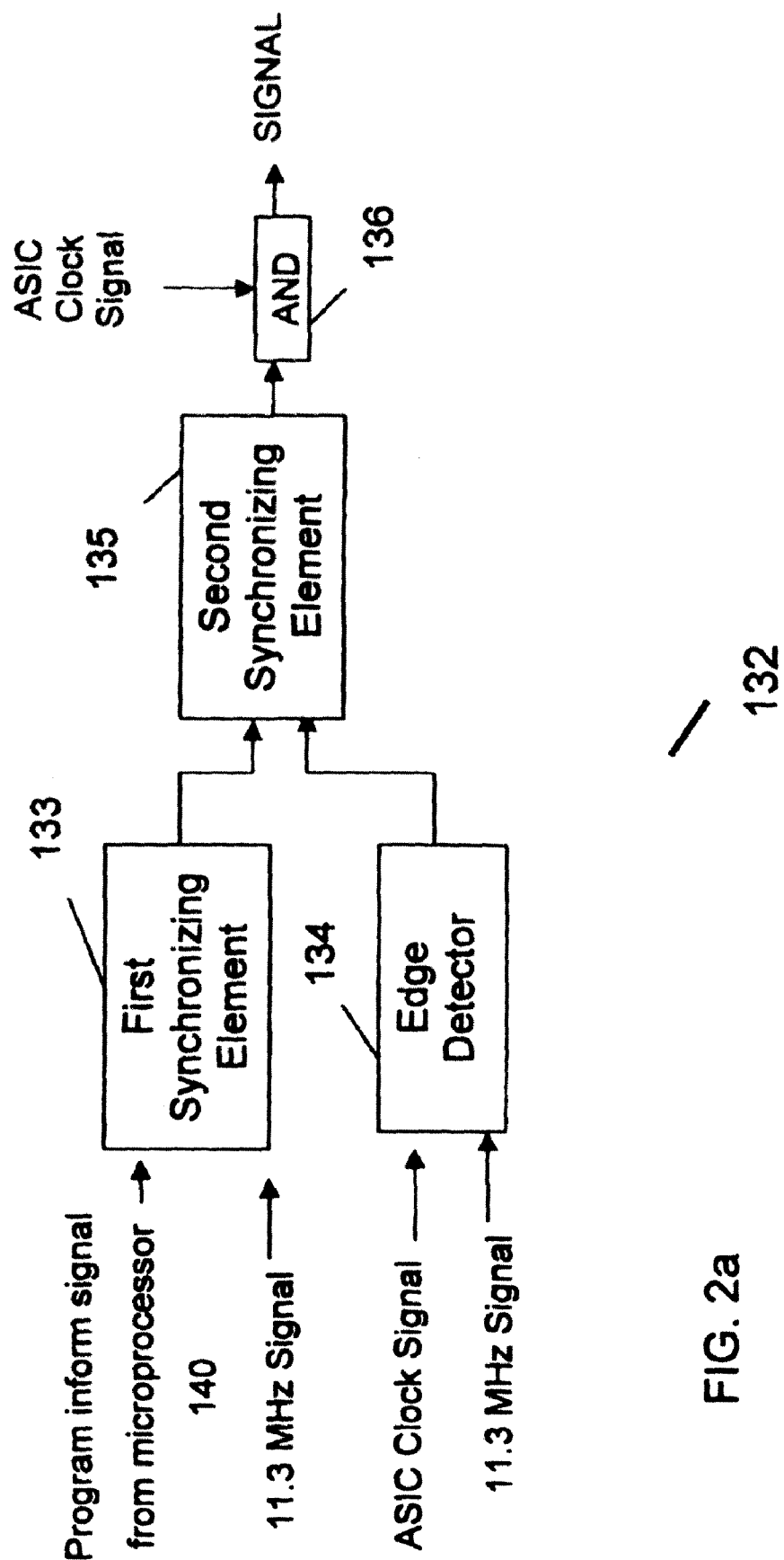
FIG. 2*a*: is a block diagram of the transmitter synchronizing circuit.
Figure 3:
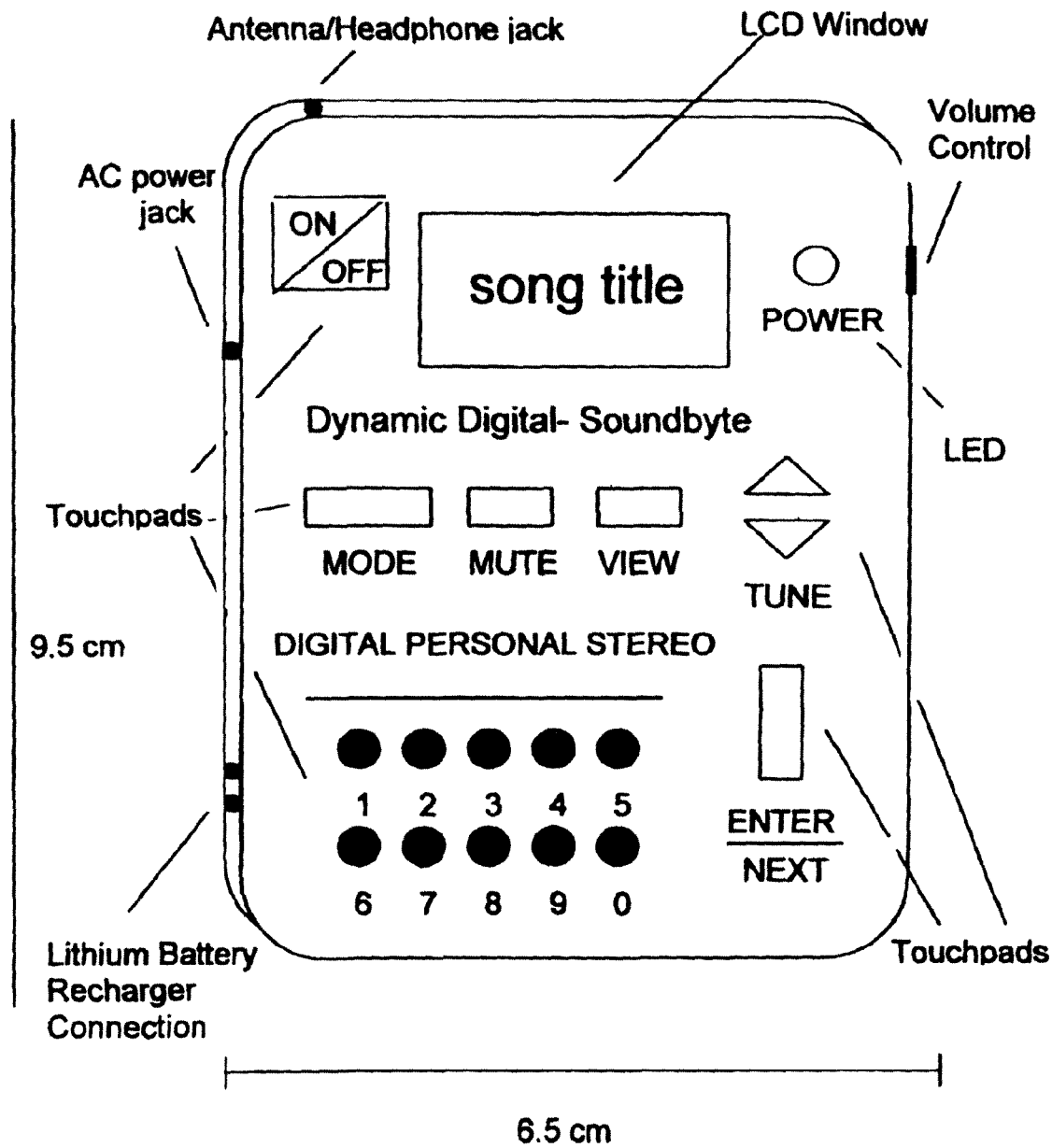
FIG. 3: is an example of a top plan view of one variation of the receiver/tuner units constructed in accordance with the preferred embodiments of the present invention.

Referring to FIGS. 2-2a, the synchronizing circuit 132 includes a first synchronizing element 133, an, edge detector 134, and second synchronized element 135, and gate 136. The microprocessor 140 provides program information signals in the form of a serial data signal formatted in the appropriate display information protocol to the first synchronizing element 133. The microprocessor 140 outputs the program information signals to the first synchronizing element 133 at a predefined data rate, preferably 4900 baud. In addition, the 11.3 mHz clock signal is provided as another input to the first synchronized element 133. The first synchronizing element 133 aligns the rising edge of the program information signals to the 11.3 mHz clock signal to provide an output signal synchronized with the 11.3 mHz clock. The second synchronizing element 135 accepts the synchronized output signal of the first synchronizing element 133 and produces a gate signal when the output signal of the edge detector 134 enables the second synchronizing element 135. The gate signal produced by the second synchronizing element 135 and the ASIC clock signal of 44.1 kHz are provided as inputs to an AND gate 136. Accordingly, the integral number of cycles of the ASIC clock signal output by the AND gate 136 is effectively determined by the pulse width or pulse duration of the gate signal output by the second synchronizing element 135.

The output of the ASIC 130 is a carrier-modulated program information signal, produced by an on/off keying technique, and is provided from the synchronizing circuit 130 on line 137 to the DRT transmitter 160. The carrier-modulated program information signal, when formatted with appropriate start bits, stop bits, and other formatting information described below, comprises a display information signal that is ultimately display as alphanumeric characters on the display of the DRT 200. The DRT transmitter 160 is responsive to the carrier-modulated program information signal provided on line 137. The microprocessor 140 initiates a transmission of a program information signal by the DMT 100. In response to the initiation of a transmission, the ASIC 130 outputs the synchronized program information signal at the rate defined by the first frequency (44.1 KHz) to the DRT transmitter 160.

The DRT receiver 170 includes a demodulator 172 and RF diode 174. The RE diode 174 is located between an input of the demodulator 172 and the ground. When the RF diode 174 detects a command signal from the DRT 200. The RF diode 174 outputs a detected signal to the demodulator 172. The demodulator 172 demodulates and filters the detected RF signal and provides an output voltage signal to the receiver input terminal of the microprocessor 140 on line 173. The demodulator 172 provided the specific functions preamplification, bandpass filtering, and detection of the detected RF signal provided by the RF diode 174.

Digital Receiver/Tuner

FIG. 4 is a block diagram of the preferred digital receiver/tuner (DRT) unit 200. The preferred DRT units, not limited to the embodiments in FIG. 3, include a display for the control of the digital music transmitter (DMT) 100. The top surface of the DRT 200 includes an alphanumeric character display and a matrix of contact switches forming a keypad. Each contact switch of the keypad is covered by a push button or key that includes a label which defines the function or instruction initiated when the user presses the push button. In addition, selected areas of the tip surface of the DRT unit include labels or other indicia that further designate the function or instruction associated with the key or push button. The user can control the functions of the DMT 100 in a manner similar to the use of currently popular wireless transmitter/receiver units that control the functions of consumer products, such as cordless telephones or local audio signal transmitter.

Specifically, the DMT 100 remains in a dormant mode with a transmitted passive signal that responds to a selected command function from the DRT unit 200. The user can initiate or terminate transmission of the digital audio and program information from the DMT 100 by pressing a selected key. Each of the buttons or key of the keypad is labeled to indicate the function associated with the key.

For example, by pressing any key or a set of keys labeled with Arabic numerals 0-9, a user can select one of the available digital audio and program information channels transmitted by the DMT 100 for the listening pleasure of the subscriber. The keys labeled TUNE (up arrow) and TUNE (down arrow) may be used by the listener to increment or decrement the digital audio and program information channels transmitted by the DMT 100. In a similar fashion, a volume up (VOL up arrow) and a volume down (VOL down arrow) keys can be utilized to control the volume level provided by the DMT 100. An ON/OFF key with a power indicator light may be utilized by the listener to either power on or off the DRT 200 and DMT 100 signal transmission. Also, a MUTE key is useful for eliminating the audible portion of the program provided by the DMT 100. Those persons skilled in the art will appreciate that such control functions are similar to the control function provided by other wireless remote controls for consumer products.

Other control function related to the control of the DMT 100 by the DRT unit 200 include control functions associated with the keys ENTER/NEXT. PRESET and MODE. By pressing the ENTER/NEXT key, the user initiates a command function that may be associated with the various functions of the DRT unit 200. The PRESET key permits the user to store a favorite digital audio channel for future operations by the DRT unit 200. The MODE function changes the message field on the LCD viewscreen according to selected function by the user, for example viewing or storing program information for a current music selection, participating in music surveys, or purchase of music via electronic account.

The listener can also review the program information associated with a current program by inputting an information request for transmission to the DMT 100. By pressing the VIEW key, the user initiates the transmission of an information request by the DRT unit 200 to the DMT 100. The DMT processes the information request and initiates a search for program information associated with the current program. If the program information is not found by the DMT within a predetermined timer period, typically about five seconds, the DMT 100 will respond to the transmitted information request by transmitting an error message to the DRT unit 200. If the search by the DMT 100 is successful, the DMT 100 will respond to the transmitted information request by transmitting the program information to the DRT unit 200. With respect to digital audio signals, a typical program message includes information concerning the composer, the track title, the artist, the album associated with the track title, and custom information concerning the current performance.

Referring to FIG. 4, the preferred DRT unit 200 includes a processor 240, preferably a microcomputer or microcontroller, having on-board mask programmed memory, such as a read only memory (ROM) 240a. The memory 205a comprises plurality of memory locations for storing parameters associated with different control signal protocols (in particular, for storing a plurality of parameters associated with different control protocols for different controllable devices). The preferred DRT unit 200 further includes a RF receiver 201, demodulator 218, an applications specific integrated circuit ASIC 230, digital/audio converter 270, transmitter 260, a data clock recovery PLL 225, front panel interface 250, stereo output amplifier 280.

The output of the demodulator 218 is quadrature partial response (QpR) demodulated to produce a 5.6 Mbps data stream containing 150 stereo pair of digital audio data to the ASIC 230. The demodulator provides data to a data clock recovery PLL 225. The data clock recovery PLL 225 contains a 33.8688 mHz crystal 122 (about 33.9 mHz) for timing purposes. In the preferred embodiment, the DMT 100 control signal protocols are stored in the ROM 240a. The control protocol includes the properly formatted codes associated with control functions for the DMT 100.

The ASIC 230 provides demultiplexing, decrypting, and decoding operations upon the 5.6 Mbps data stream input by the demodulator 218 to the microprocessor 170. The ASIC 230 separates the 5.6 Mbps data stream to a select one of 150 stereo pairs of digital audio signals. The selected stereo pair is decrypted and separated to provide a program information signal and a digital audio signal. The digital audio signal is then decoded according to a variety of known techniques. The ASIC 230 inputs the digital audio and program information signals, provided at a sampling rate of 44.1 kHz, to a digital/audio converter 270, transmitter control 260, and microprocessor memory 240a. The demultiplexed control and channel data separated out from the data steam by the ASIC 230 are provided to a microprocessor 240 which controls the overall operation of the DRT unit 200.

A clock signal generated internal to the ASIC 230 is utilized as a carrier signal to switch the output of the DRT 200 ON or OFF at a frequency of 44.1 KHz. The 44.1 KHz clock from an ASIC Clock generator 230a may be utilized to generate a carrier signal for RF signals sent by the DRT transmitter 160. The ASIC Clock signal provided by the ASIC clock 230a is derived from the about 33.9 mHz signal provided to the ASIC 230 by the data clock PLL 225. The DRT 200 operates to control selected functions of the DMT 100 as well as the program information transmitted by the DRT transmitter 260 associated with the DMT 100. Referring to FIG. 2a, the ASIC Clock signal provided by the ASIC clock 230a is similar in function and purpose to that of the aforementioned ASIC clock 130a. As result, the 11.3 mHz clock signal is utilized as a clock signal selected operations conducted by the ASIC 230.

Referring again to FIG. 4., for a first operation mode, digital audio and program information carrier signals are received by the receiver antenna 201 from the DMT transmitter 160. The received signal is provided to a double tuned tracking filter (DTTF) with PLL circuitry, from there to an amplifier 203, on to a single tuned tracking filter (STTF) 205, a mixer 207, and SAW filter 209, and into a demodulator 218, according to known techniques. The channel selection process is under control of a tuning synthesizer 220, integrating amplifier 217, STTF 215, and amplifier 212, interconnected as shown and impressing an appropriate signal on a line 211 to the DTTF 201, STTF 205, and oscillator 210 to effect channel selection, according to known techniques. The program information signal from the ASIC 230 is sent to the microprocessor 240 where it may be displayed on the front panel interface 250. The ASIC 230 also sends the program information signal to the transmitter interface 255 and transmitter control 260 for transmission to the DMT 100. Channel selection is provided by the infrared receiver and/or front panel interface 250, which information is passed on by the microprocessor 240 to the tuning synthesizer 220.

The ASIC 230 inputs the digital audio and program information signals, provided at a sampling rate of 44.1 kHz to a digital/audio converter 270. The output of the D/A 270 device is provided as a data stream over a bus to a logic circuit 274 with separates the dates stream into control bits and channel indication (tag bits) and encrypted digital audio bits (demultiplexing functions) and decrypts the digitized audio data into a suitable form for a Dolby decoder 278. The audio data is decrypted into three serial streams per audio channel consisting of basic delta modulation parameters for "left" and "right" channels. The output of the Dolby decoder 278 is provided as "left" and "right" audio channels to a stereo amplifier 280, and to stereo outputs for use with standard audio components.

From the foregoing description of the preferred embodiment, it will be appreciated that the present invention overcomes the disadvantages of the prior art and achieves the objects and advantages of the invention recited above. Accordingly, the invention improves existing methods of providing digital music by making the service more convenient and accessible to subscribers through wireless transmission of music to remotely located devices. Greater recognition among subscribers is gained by similarities of the preferred embodiments to more popular consumer electronic music devices. And, digital music is made more versatile with improved methods of subscriber interaction with the service. The above description of the invention is intended to be illustrative and not limiting. Various changes or modifications in the embodiments described may occur to those skilled in the art and these can be made without departing from the spirit or the scope of the invention.

What is claimed is:

1. A wireless digital audio player for operation by a user, comprising:
   a user interface for the user to select a digital audio program from a plurality of digital audio programs;
   a tuner to tune to a radio frequency signal associated with the selected digital audio program;
   a demodulator to receive from the tuner a radio frequency signal and to demodulate the radio frequency signal, wherein the radio frequency signal carries digital audio data and program information corresponding to the selected digital audio program;
   a processor coupled to the user interface for separating the program information from the digital audio data; and
   a digital to analog converter to convert the audio data corresponding to the selected digital audio program into an analog signal for playback by the user.

2. The wireless digital audio player of claim 1, wherein the user interface includes a switch for user activation of a control signal to request the transmission of digital audio data.

3. The wireless digital audio player of claim 2, further comprising a transmitter coupled to the user interface to transmit the control signal.

4. The wireless digital audio player of claim 1, wherein the user interface includes a key for transmission of a control signal for the purchase of the selected digital audio program.

5. The wireless digital audio player of claim 1, wherein the user interface includes a key for purchasing music using information from an account of the user.

6. The wireless digital audio player of claim 1, wherein the user interface includes a keypad for selecting a digital audio program.

7. The wireless digital audio player of claim 1, wherein the user interface includes a keypad for responding to a music survey.

8. The wireless digital audio player of claim 1, wherein the received radio frequency signal carries music survey data.

9. A wireless digital audio player for operation by a user, comprising:
   a user interface for the user to select a digital audio program from a plurality of digital audio programs;
   a tuner to tune to a radio frequency signal associated with the selected digital audio program;
   a demodulator to receive from the tuner a radio frequency signal and to demodulate the radio frequency signal, wherein the radio frequency signal carries digital audio data and program information corresponding to the selected digital audio, program; and
   a processor coupled to the user interface for separating the program information from the digital audio data;
   wherein the user interface includes a switch for user activation of a control signal to request the transmission of digital audio data.

10. The wireless digital audio player of claim 9, further comprising a transmitter coupled to the user interface to transmit the control signal.

11. The wireless digital audio player of claim 9, wherein the user interface includes a key for transmission of a control signal for the purchase of the selected digital audio program.

12. The wireless digital audio player of claim 9, wherein the user interface includes a key for purchasing music using information from an account of the user.

13. The wireless digital audio player of claim 9, wherein the user interface includes a keypad for selecting a digital audio program.

14. The wireless digital audio player of claim 9, wherein the user interface includes a keypad for responding .to a music survey.

15. The wireless digital audio player of claim 9, wherein the received radio frequency signal carries music survey data.

16. A wireless digital audio player for operation by a user, comprising:
   a user interface for the user to select a digital audio program from a plurality of digital audio programs;
   a tuner to tune to a radio frequency signal associated with the selected digital audio program;
   a demodulator to receive from the tuner a radio frequency signal and to demodulate the radio frequency signal, wherein the radio frequency signal carries digital audio data and program information corresponding to the selected digital audio program; and a processor coupled to the user interface for separating the program information from the digital audio data;

wherein the user interface includes a key for transmission of a control signal for the purchase of the selected digital audio program.

17. The wireless digital audio player of claim 16, wherein the user interface includes a key for purchasing music using information from an account of the user.

18. The wireless digital audio player of claim 16, wherein the user interface includes a keypad for selecting a digital audio program.

19. The wireless digital audio player of claim 16, wherein the user interface includes a keypad for responding to a music survey.

20. The wireless digital audio player of claim 16, wherein the received radio frequency signal carries music survey data.

* * * * *